United States Patent
Fujimoto et al.

(10) Patent No.: US 11,434,891 B2
(45) Date of Patent: Sep. 6, 2022

(54) VIBRATION DEVICE

(71) Applicant: Murata Manufacturing Co., Ltd., Nagaokakyo (JP)

(72) Inventors: Katsumi Fujimoto, Nagaokakyo (JP); Chikahiro Horiguchi, Nagaokakyo (JP); Kenji Nishiyama, Nagaokakyo (JP); Yasuhiro Kuratani, Nagaokakyo (JP); Shinichiro Ichiguchi, Nagaokakyo (JP); Hitoshi Sakaguchi, Nagaokakyo (JP)

(73) Assignee: MURATA MANUFACTURING CO., LTD., Kyoto (JP)

( * ) Notice: Subject to any disclaimer, the term of this patent is extended or adjusted under 35 U.S.C. 154(b) by 453 days.

(21) Appl. No.: 16/663,446

(22) Filed: Oct. 25, 2019

(65) Prior Publication Data

US 2020/0055087 A1 Feb. 20, 2020

Related U.S. Application Data

(63) Continuation of application No. PCT/JP2017/044349, filed on Dec. 11, 2017.

(30) Foreign Application Priority Data

May 12, 2017 (JP) .............. JP2017-095741

(51) Int. Cl.
*B06B 1/06* (2006.01)
*F04B 43/04* (2006.01)
*B06B 1/04* (2006.01)

(52) U.S. Cl.
CPC ............ *F04B 43/04* (2013.01); *B06B 1/0648* (2013.01); *B06B 1/045* (2013.01)

(58) Field of Classification Search
CPC ...... H01L 41/0533; H03H 9/13; H03H 9/171; H03H 9/564
See application file for complete search history.

(56) References Cited

U.S. PATENT DOCUMENTS 10,156,719 B2 12/2018 Fujimoto et al.
10,268,039 B2 * 4/2019 Nishiyama ............ G03B 17/56
(Continued)

FOREIGN PATENT DOCUMENTS

EP 2 039 934 A1 3/2009
JP 3978875 B2 9/2007
(Continued)

OTHER PUBLICATIONS

Official Communication issued in corresponding European Patent Application No. 17909352.1, dated Jan. 26, 2021.
(Continued)

*Primary Examiner* — J. San Martin
(74) *Attorney, Agent, or Firm* — Keating & Bennett, LLP

(57) ABSTRACT

A vibration device includes a top plate elastic body, a cylindrical body that includes a first end portion and a second end portion and is coupled with the top plate elastic body to retain the top plate elastic body on a side of the first end portion. The cylindrical body includes on a side of the second end portion, a ring-shaped flange portion extended outward in a radial direction of the cylindrical body, and a piezoelectric element fixed to the ring-shaped flange portion to cause the cylindrical body to vibrate.

16 Claims, 13 Drawing Sheets

(56) References Cited

U.S. PATENT DOCUMENTS

| | | | |
|---|---|---|---|
| 2003/0214599 A1 | 11/2003 | Ito et al. | |
| 2012/0050860 A1* | 3/2012 | Sakatani | G03B 11/00 |
| | | | 359/507 |
| 2014/0033454 A1 | 2/2014 | Koops et al. | |
| 2018/0095272 A1* | 4/2018 | Fujimoto | B06B 3/02 |
| 2018/0161829 A1* | 6/2018 | Horie | G01N 35/1002 |

FOREIGN PATENT DOCUMENTS

| | | |
|---|---|---|
| JP | 2009-103111 A | 5/2009 |
| JP | 4905170 B2 | 3/2012 |
| WO | 2006/127181 A2 | 11/2006 |
| WO | 2017/022382 A1 | 2/2017 |

OTHER PUBLICATIONS

Official Communication issued in International Patent Application No. PCT/JP2017/044349, dated Mar. 13, 2018.

* cited by examiner

VIBRATION DEVICE

CROSS REFERENCE TO RELATED APPLICATIONS

This application claims the benefit of priority to Japanese Patent Application No. 2017-095741 filed on May 12, 2017 and is a Continuation Application of PCT Application No. PCT/JP2017/044349 filed on Dec. 11, 2017. The entire contents of each application are hereby incorporated herein by reference.

BACKGROUND OF THE INVENTION

1. Field of the Invention

The present invention relates to a vibration device that uses a piezoelectric element, is a drip-proof vibration device by which an internal portion is protected from liquids and outside air, has a structure in which the piezoelectric element is less likely to be fractured even at a large amplitude, and is used for, for example, a water droplet removal device of a camera. The present invention further relates to an ultrasonic transmitter and a microphone that utilize vibration in fan ultrasonic band emitted to a gas space or a liquid space, and a pump device that utilizes the viscosity of air or liquid.

2. Description of the Related Art

As a piezoelectric vibration generation device that excites bending vibration, for example, a vibrating body having a unimorph structure has been known as a sounding body in which a flat-plate piezoelectric element is joined to a disk elastic body. When a glass material of a light transmission body is used as an elastic body portion and a ring-shaped piezoelectric element is joined to the elastic body portion, a transparent vibrating body is obtained. For example, in Japanese Patent No. 4905170, a light transmission body cover is disposed in front of an image-capturing element of a camera. Various devices for removing dirt and water droplets attached to the cover have been suggested. A disk-shaped dust-proof member is disposed in front of an image-capturing element. An outer peripheral edge of the dust-proof member is supported by a frame-shaped joining member with lower rigidity than the dust-proof member. A lower surface of the frame-shaped joining member is fixed to and supported by a cylindrical body. A vibration member formed with a piezoelectric element is fixed to a lower surface of the joining member. By causing the vibration member to vibrate, the dust-proof member is vibrated as well, and dirt, water droplets, or the like attached to a surface is thereby removed. In addition, Japanese Patent No. 3978875 discloses an ultrasonic transducer in which a piezoelectric element is internally joined to a top plate portion in a circular cylindrical shape. Further, for example, Japanese Unexamined Patent Application Publication No. 2009-103111 discloses a pump mechanism that uses a unimorph vibrating body at an ultrasonic frequency body by using air viscosity.

In the device disclosed in Japanese Patent No. 4905170, even if the vibrating body is caused to vibrate, water droplets or the like attached to the surface of the dust-proof member may not be removed with certainty. Further, in Japanese Patent No. 3978875 and Japanese Unexamined Patent Application Publication No. 2009-103111, because a piezoelectric ceramic is joined directly under a maximum vibration portion of a vibration plate, in a case where sound pressure is raised or a flow rate or delivery pressure is raised by increasing the amplitude, a fracture of the piezoelectric ceramic or a fracture of a joining portion are factors that define the limit of the amplitude level, in addition to the fracture limitation of a material of the vibration plate.

SUMMARY OF THE INVENTION

Preferred embodiments of the present invention provide vibration devices that each efficiently amplify vibration generated by a piezoelectric element, indirectly cause an elastic vibration plate itself that includes a light transmission body to vibrate, and replace a unimorph vibrating body in the related art. In addition, preferred embodiments of the present invention provide vibration devices that may each remove with certainty water droplets or the like attached to a surface of a light transmission body as a top plate elastic body disposed on an object side of an image-capturing element. In addition, preferred embodiments of the present invention provide ultrasonic transducer devices that each may drive the top plate elastic body at a large amplitude by using the vibration device. In addition, preferred embodiments of the present invention provide pump devices for gas and liquid that each may be driven at a large amplitude by using the vibration device.

A vibration device according to a preferred embodiment of the present invention includes a top plate elastic body; a cylindrical body that includes a first end portion and a second end portion on an opposite side from the first end portion and is coupled with the top plate elastic body to retain the top plate elastic body on a side of the first end portion, the cylindrical body including, on a side of the second end portion, a ring-shaped flange portion extending outward in a radial direction of the cylindrical body; and a piezoelectric element that is fixed to the ring-shaped flange portion to cause the cylindrical body including the ring-shaped flange portion to vibrate.

In a vibration device according to a preferred embodiment of the present invention, the ring-shaped flange portion includes a first surface on a side of the top plate elastic body and a second surface on an opposite side from the first surface, and the piezoelectric element is fixed to the second surface. In this case, the top plate elastic body performs bending vibration in response to vibration of the piezoelectric element, an amplitude of the top plate elastic body is increased to a large amplitude by vibration of the piezoelectric element by a specific design, and bending vibration may thus be caused to occur.

In a vibration device according to a preferred embodiment of the present invention, in a case where the piezoelectric element is driven, the top plate elastic body is vibrated in a first mode in which a phase of vibration in the ring-shaped flange portion of the cylindrical body is reverse to a phase of the top plate elastic body coupled with the cylindrical body. In this case, because a node of vibration is positioned in an outer side surface that includes the first end portion of the cylindrical body, while a lower surface than this portion is isolated and sealed and the piezoelectric element is protected from outside air, the top plate elastic body may more effectively be caused to vibrate.

In a vibration device according to a preferred embodiment of the present invention, in a case where a ratio between a maximum displacement of the piezoelectric element and a bending vibration amplitude of the top plate elastic body is defined as an amplitude increase ratio, a distance between the first end portion and the second end portion is longer than a distance between the first end portion and the second end portion of the cylindrical body, and vibration occurs in the second mode, the shorter distance being set such that the amplitude increase ratio in a second mode has a same or substantially a same value as the amplitude increase ratio in the first mode, the second mode being a mode in which the phase of vibration in the ring-shaped flange portion of the cylindrical body and the phase of vibration in the top plate elastic body coupled with the cylindrical body are identical phases in a case where the piezoelectric element is driven.

In a case where a ratio between the maximum displacement of the piezoelectric element and the amplitude of the top plate elastic body is set as the amplitude increase ratio, the amplitude increase ratio in the first mode is the same or almost the same as the amplitude increase ratio in the second mode when the height of the cylindrical body reaches a specific value. However, a design is selected such that the first mode is used in a case where the height of a cylinder body is less than the specific value and a second vibration mode is used in a case where the height is greater than the specific value. As a result, even if the displacement of the piezoelectric element is regularly small, a state where the top plate elastic body is largely displaced is maintained. Thus, damage to the piezoelectric element in a case of a large amplitude is able to be avoided. Further, in a case where the height of the cylindrical body is high, a node that is located in a surface of the top plate elastic body moves to a hinge portion or a portion directly above the cylindrical body even in the second mode. Thus, a large displacement region may be ensured, and a similar function to the first mode is maintained.

In a vibration device according to a preferred embodiment of the present invention, the piezoelectric element is annularly disposed along a circumferential direction of the ring-shaped flange portion.

In a vibration device according to a preferred embodiment of the present invention, a distance between the first end portion and the second end portion of the cylindrical body is equal to or longer than a thickness of the ring-shaped flange portion.

In a vibration device according to a preferred embodiment of the present invention, a dimension of the ring-shaped flange portion that extends outward in the radial direction is longer than a distance between the first end portion and the second end portion of the cylindrical body. In this case, polarization or electrode arrangement in the piezoelectric element is provided, and the top plate elastic body may thus effectively be caused to vibrate in higher order mode vibration.

In a vibration device according to a preferred embodiment of the present invention, a distance between the first end portion and the second end portion of the cylindrical body is selected such that a position of a node of vibration in the first mode is positioned inward in the radial direction of an outer circumferential edge of the ring-shaped flange portion. In this case, the top plate elastic body may more effectively be caused to vibrate.

In the vibration devices according to preferred embodiments of the present invention, at least one of the top plate elastic body, the cylindrical body, and the ring-shaped flange portion may be made with a different member from remaining members.

Further, in preferred embodiments of the present invention, the top plate elastic body, the cylindrical body, and the ring-shaped flange portion may be integrally defined by the same material.

In a vibration device according to a preferred embodiment of the present invention, the piezoelectric element includes a ring-shaped piezoelectric body that is polarized in a direction in which the first and second end portions of the cylindrical body are coupled together and electrodes that are provided on one surface and another surface of the ring-shaped piezoelectric body. In this case, the piezoelectric element may easily be configured by using the ring-shaped piezoelectric body for which a poling treatment is evenly performed. In addition, in a case where excitation in a higher order mode is performed, a direction reversal arrangement of electrodes or polarization that are divided in the circumferential direction in accordance with the mode order is used.

A raindrop or dirt removal device according to a preferred embodiment of the present invention includes a vibration device according to a preferred embodiment of the present invention; and a camera device that is disposed behind the top plate elastic body of the vibration device. The top plate elastic body is a light transmission body.

An ultrasonic transducer device according to a preferred embodiment of the present invention includes a vibration device according to a preferred embodiment of the present invention; and an envelope. Bending vibration of the top plate elastic body is used as a sound wave generation source and the envelope retains a node line of the top plate elastic body.

A pump device according to a preferred embodiment of the present invention includes a vibration device according to a preferred embodiment of the present invention; and a liquid delivery member that defines a liquid delivery portion with the top plate elastic body of the vibration device. A pass-through hole is provided in the liquid delivery member, the top plate elastic body is used as a diaphragm, and the pass-through hole of the liquid delivery member is pushed out by a fluid.

By using a vibration device according to a preferred embodiment of the present invention, in a case where the top plate elastic body is provided as the light transmission body, raindrops or dirt may be effectively moved or removed by the amplitude increase effect even if excitation is performed at a low voltage while the piezoelectric element is protected from outside air. Further, as the ultrasonic transducer device, mounting of the top plate elastic body as an ultrasonic wave emission portion is retained in a region in a portion close to a top plate in which few protrusions are provided, an amplitude equal to or larger than the displacement of the piezoelectric element is generated, and transmission of high sound pressure is enabled, in an environment exposed to outside air, such as an environment of a bumper of a vehicle, for example. In addition, as the pump device of liquid and gas, large pressure as a pump may be generated as in the ultrasonic transducer device that is not constrained by a piezoelectric amplitude.

In vibration devices according to preferred embodiments of the present invention, displacement of a piezoelectric element may effectively be used for an increase in bending vibration of a top plate elastic body while the piezoelectric element is protected from outside air, removal performance of raindrops or dirt may be improved, and contribution to an improvement in sound pressure or discharge pressure may be provided.

The above and other elements, features, steps, characteristics and advantages of the present invention will become more apparent from the following detailed description of the preferred embodiments with reference to the attached drawings.

DETAILED DESCRIPTION OF THE PREFERRED EMBODIMENTS

Preferred embodiments of the present invention will be described in detail hereinafter with reference to drawings in order to clarify the present invention.

It is noted that each preferred embodiment described herein is an example and partial substitution or combination of configurations between different preferred embodiments is possible.

Figure 1:
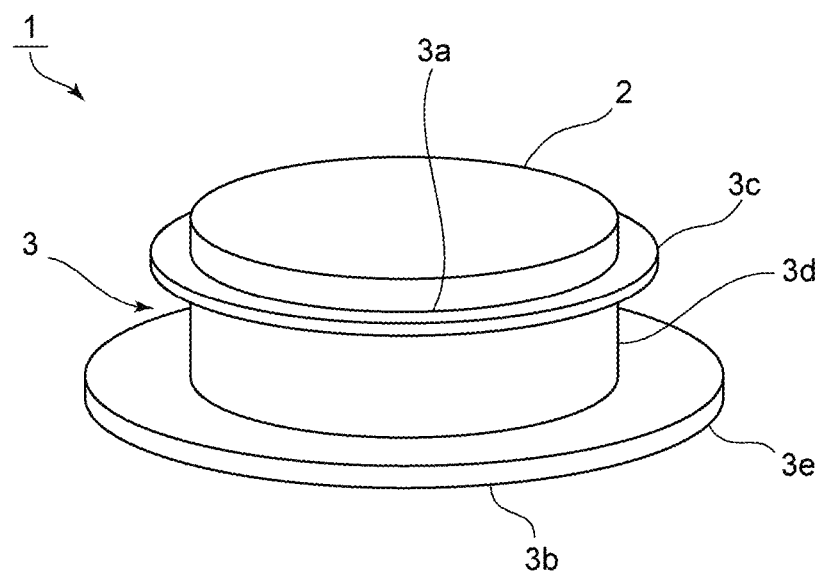
FIG. 1 is a perspective view that illustrates the external appearance of a vibration device according to a first preferred embodiment of the present invention.
Figure 2:
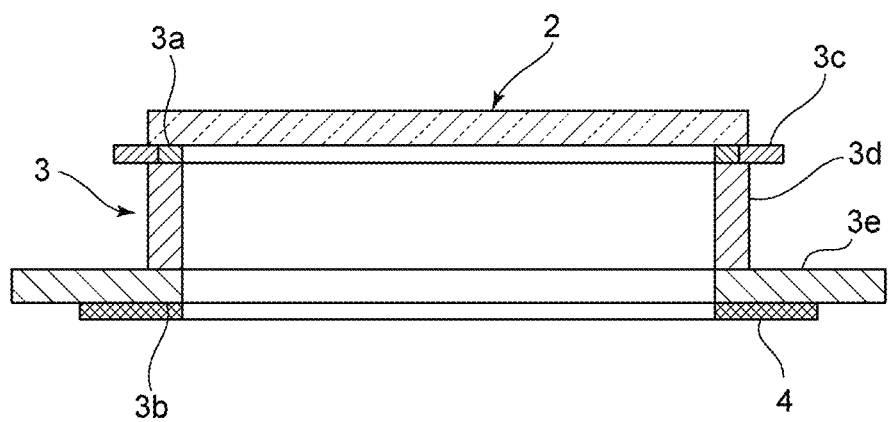
FIG. 2 is a front sectional view of the vibration device according to the first preferred embodiment of the present invention.
Figure 3:
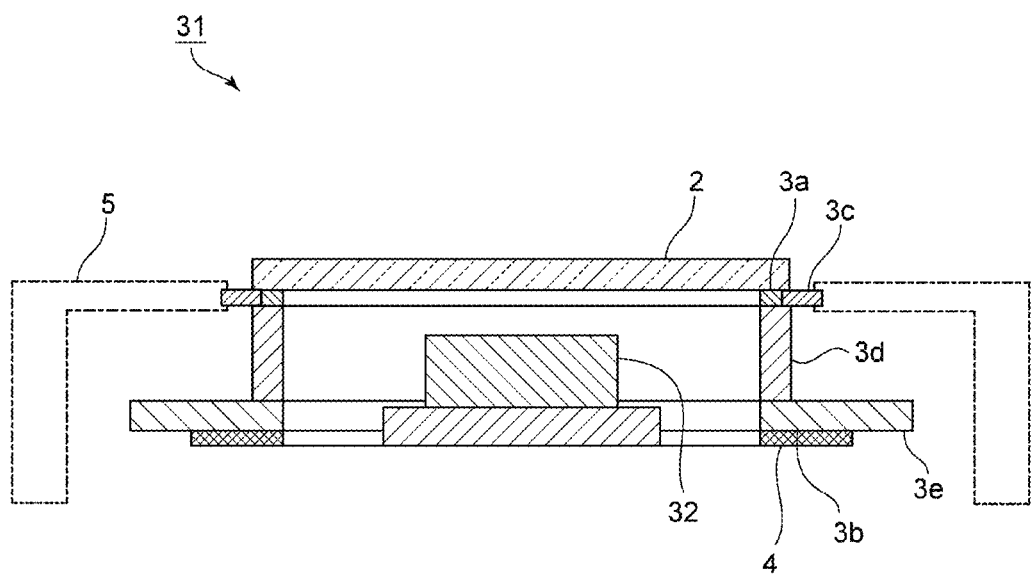
FIG. 3 is a front sectional view of a camera that includes the vibration device according to the first preferred embodiment of the present invention and a top plate elastic body as a light transmission body.

FIG. 1 is a perspective view that illustrates the external appearance of a vibration device according to a first preferred embodiment of the present invention, and FIG. 2 is a front sectional view of the vibration device. FIG. 3 is a front sectional view of a camera, as one example of a practical application of the vibration device, the camera including the vibration device according to the first preferred embodiment and a top plate elastic body as a light transmission body.

As illustrated in FIG. 1 and FIG. 2, a vibration device 1 includes a light transmission body 2 as a top plate elastic body. As illustrated in FIG. 3, in a camera 31, the light transmission body 2 as the top plate elastic body is disposed on an object side of an image-capturing element 32, that is, in front thereof. In this case, the light transmission body 2 is preferably made of a light transmitting material. As the light transmitting material, light transmitting plastics or glasses, light transmitting ceramics, or the like, for example, may be used.

Examples of the image-capturing element 32 may include, for example, a CMOS, a CCD, a radar, a LIDAR device, and the like which receive light at any wave length of the visible region to the far infrared region.

A cylindrical body 3 is coupled with the light transmission body 2. The cylindrical body 3 preferably has a circular or substantially circular cylindrical shape. The cylindrical body 3 includes a first end portion 3a and a second end portion 3b on the opposite side from the first end portion 3a. The second end portion 3b is positioned on the opposite side from the first end portion 3a in the axial direction of the circular or substantially circular cylindrical body.

The first end portion 3a is coupled with the light transmission body 2. That is, the first end portion 3a of the cylindrical body 3 is fixed to a surface of the light transmission body 2 on the cylindrical body 3 side such that the light transmission body 2 closes an opening of the cylindrical body 3 on the first end portion 3a side.

In the present preferred embodiment, the cylindrical body 3 is preferably made of, for example, stainless steel. However, instead of stainless steel, another metal material may be used. Preferably, a metal with high rigidity, such as stainless steel is preferable.

A hinge portion 3c extending outward in the radial direction of the cylindrical body is provided on a side surface of the cylindrical body 3. The hinge portion 3c is used to externally support the vibration device 1, for example, by a support member 5 indicated by imaginary lines in FIG. 3. A ring-shaped flange portion 3e extending outward in the radial direction is provided on the second end portion 3b side of the cylindrical body 3. The ring-shaped flange portion 3e preferably has a donut shape in a plan view. A portion between the hinge portion 3c and the ring-shaped flange portion 3e is a cylindrical body main body 3d. The outer diameter of the ring-shaped flange portion 3e is larger than the outer diameter of the cylindrical body main body 3d. Although not particularly limited, in the present preferred embodiment, the outer diameter of the cylindrical body main body 3d is preferably set to be equal or substantially equal to the outer diameter of the light transmission body 2.

The ring-shaped flange portion 3e may be integrally provided with the cylindrical body main body 3d by using the same material. However, in the present preferred embodiment, with respect to the cylindrical body main body 3d, the ring-shaped flange portion 3e defined by a different member is joined to an end surface of the cylindrical body main body 3d on the opposite side from the light transmission body 2. In such a manner, the ring-shaped flange portion 3e may be defined by a different member from the cylindrical body main body 3d.

A ring-shaped piezoelectric element 4 is fixed to a surface on the opposite side from a side of the ring-shaped flange portion 3e that is positioned on the light transmission body 2 side.

Figure 4A:
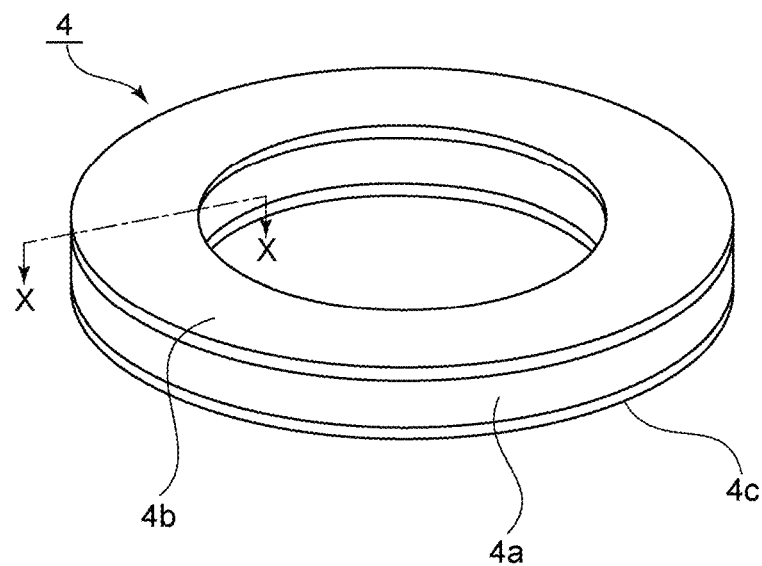
FIG. 4A is a perspective view of a ring-shaped piezoelectric element.
Figure 4B:
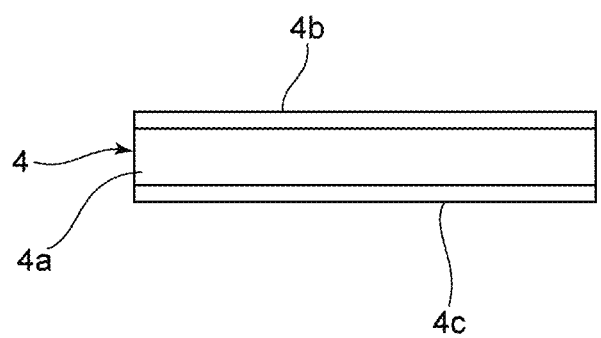
FIG. 4B is a sectional view taken along line X-X in FIG. 4A.

FIGS. 4A and 4B are perspective views of the ring-shaped piezoelectric element 4 and a sectional view taken along line X-X in FIG. 4A. The ring-shaped piezoelectric element 4 includes a ring-shaped piezoelectric body 4a and electrodes 4b and 4c respectively provided on each of surfaces of the ring-shaped piezoelectric body 4a. The ring-shaped piezoelectric body 4a is polarized in the thickness direction, that is, in the direction in which the first end portion 3a and the second end portion 3b of the cylindrical body 3 are coupled together. The ring-shaped piezoelectric body 4a is preferably made of, for example, piezoelectric ceramics. A vibrating body that performs bending vibration includes the ring-shaped piezoelectric element 4 that is joined to the ring-shaped flange portion 3e. The vibration device 1 has characteristics that vibration in a bending mode in the vibrating body is transmitted to the light transmission body 2 via the cylindrical body 3 and the entire vibration device 1 may be vibrated in a first mode and a second mode, which will be described below. In the present preferred embodiment, the first mode described below is preferably used.

Figure 5A:
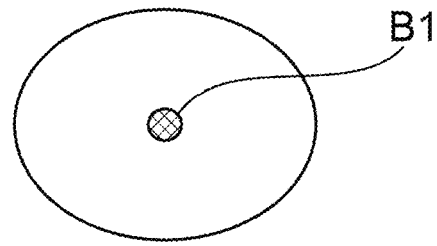
FIGS. 5A to 5D are schematic diagrams of vibration modes that occur during propagation.
Figure 5B:
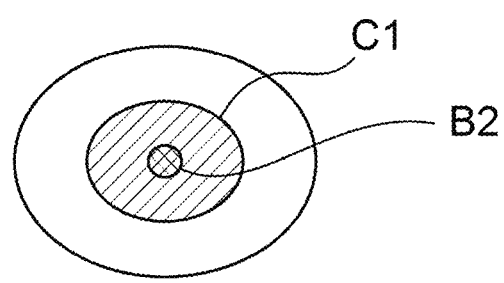
Figure 5C:
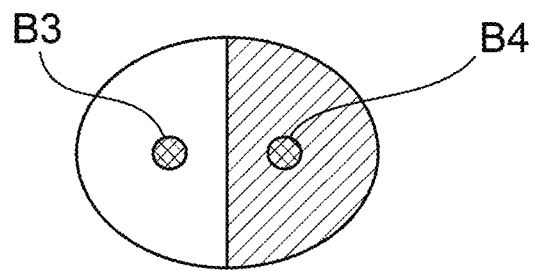
Figure 5D:
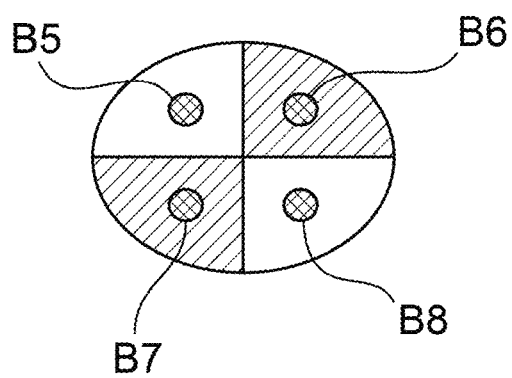

In a case where the disk-shaped light transmission body 2 vibrates, a vibration mode may be expressed by a (m,n) mode. Here, m and n are integers. m is the number of nodes of vibration that are present in the radial direction of a disk, and n is the number of nodes of vibration that are present in the circumferential direction of the disk. FIG. 5A illustrates vibration of a (0,0) mode, FIG. 5B illustrates a (1,0) mode, FIG. 5C illustrates a (0,1) mode, and FIG. 5D illustrates a (0,2) mode.

In FIGS. 5A to 5D, hatched points B1, B2, B3, B4, and B5 to B8 indicate maximum displacement points. Further, in FIGS. 5B to 5D, the regions hatched with oblique lines and blank white portions indicate portions that fluctuate in reverse phases. Consequently, in FIG. 5B, circle C1 is the node of vibration, this circle C1 is the only node that is present in the radial direction, and no node is present in the circumferential direction. Consequently, the vibration mode of FIG. 5B may be expressed by the (1,0) mode.

Particularly in a practical application to a camera in which a particular benefit is provided in a higher order mode, in a case where a water droplet is attached to a surface of the light transmission body 2 on the object side, the light transmission body 2 is caused to vibrate in the (0,0) mode or the (1,0) mode. Then, large displacement occurs around the maximum displacement point, and the attached water droplet may be atomized.

Further, in the (0,1) mode or the (0,2) mode, portions that vibrate in reverse phases occur between regions on a surface of the light transmission body. Consequently, a water droplet that is attached across nodes of vibration may be used or moved to the outside of the field of view of the camera. In the camera 31, a water droplet is removed by causing the light transmission body 2 to vibrate in such various modes. In vibration modes, in which a node line is present in the circumferential direction, such as the (0,1) mode and the (0,2) mode, a ring-shaped piezoelectric element is zoned as two portions or four portions to invert neighboring polarizations or electrode division to invert the polarity of an applied voltage is preferable.

Figure 6A:
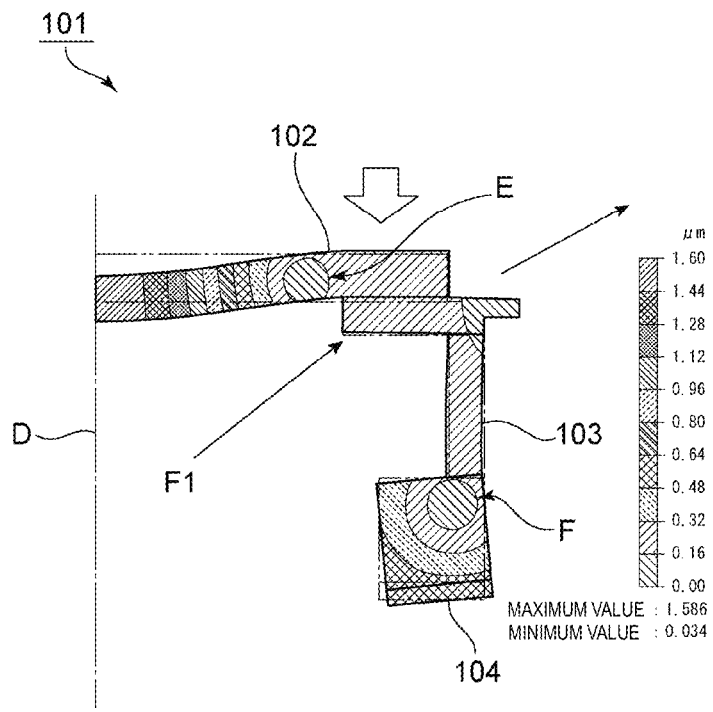
FIGS. 6A and 6B are diagrams that illustrate the relationship between breathing vibration and bending vibration of a ring-shaped vibrating body.

FIG. 6A is a schematic diagram that illustrates the displacement distribution in a case where a vibration device of a comparative example, in which a top plate elastic body is coupled with a cylindrical body, is caused to vibrate. In a vibration device 101 illustrated in FIG. 6A, a cylindrical body 103 and a ring-shaped piezoelectric element 104 are coupled with a top plate elastic body 102. Note that FIG. 6A illustrates a half sectional view of the vibration device 101. That is, one-dot chain line D is a portion that passes through the central axis of the cylindrical body 103.

Further, in FIG. 6A, on the right side of the half sectional view, a scale is illustrated which indicates the magnitudes of displacement of hatched portions in the half sectional view. The cylindrical body 103 is not provided with a ring-shaped flange portion. The remaining configurations of the vibration device 101 are the same as or similar to the vibration device 1.

Figure 6B:
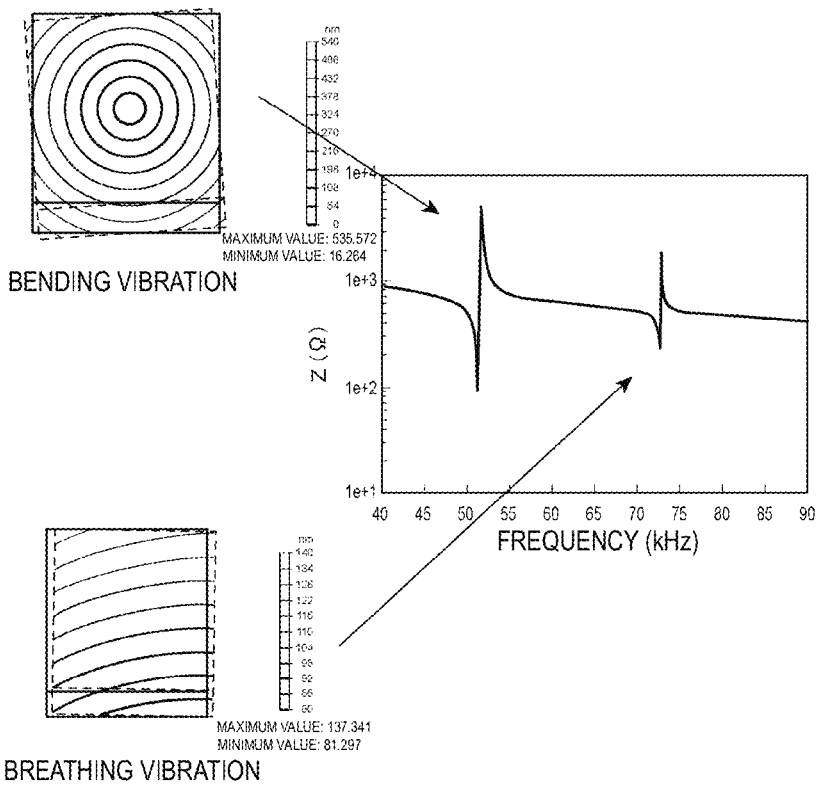

FIG. 6B illustrates two modes that appear when the ring-shaped piezoelectric element 104 is caused to vibrate in a state where a flange is not provided. The two modes include a vibration mode, which is referred to as a breathing vibration and has displacement in the circumferential direction of the cylindrical body as major displacement, and a bending vibration, in which vibration occurs as if a cross section rotated. As seen in FIG. 6B, a node is present in the latter. In other words, in a vibrating body illustrated in FIG. 6A, the top plate elastic body resonates with the bending vibration. The frequency of the bending vibration may largely be changed by providing the ring-shaped flange portion on an outer circumferential side and changing the outer diameter or the thickness of the ring-shaped flange portion. On the other hand, the breathing vibration is defined by a mean diameter defined by the outer diameter and inner diameter or stepped shapes. Particularly in a case where the inner diameter is defined, the lower limit of frequency is defined by the inner diameter. As a result, in a design that does not include a flange, in a case where a bending resonant frequency of the top plate elastic body is low, that is, a case where the top plate elastic body is thin and has the large inner diameter, an idea is requested by which the thickness is made relatively thick by using an "eaves" structure as indicated by arrow F1, the resonant frequency is raised, and a resonance effect is improved. However, it is preferable that, in the (0,0) mode, the top plate elastic body vibrates such that the farthest portion of an outer circumferential portion vibrates. In use for a camera, there are disadvantages that the field of view is narrowed due to the eaves and raindrops or dirt in peripheral portions may not be moved or removed. Further, it is not desirable that sound pressure or generated pressure is relatively lowered.

Figure 7:
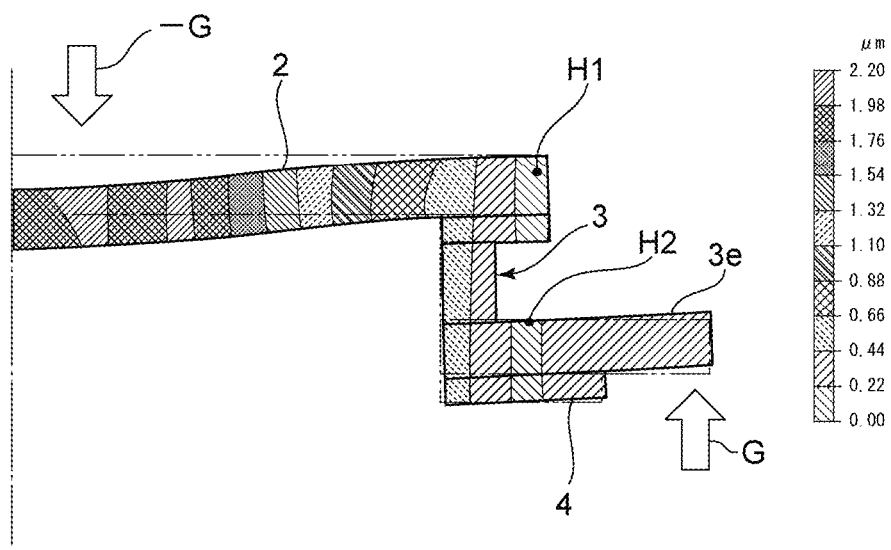
FIG. 7 is a schematic diagram that illustrates displacement distribution for explaining a first mode.
Figure 8:
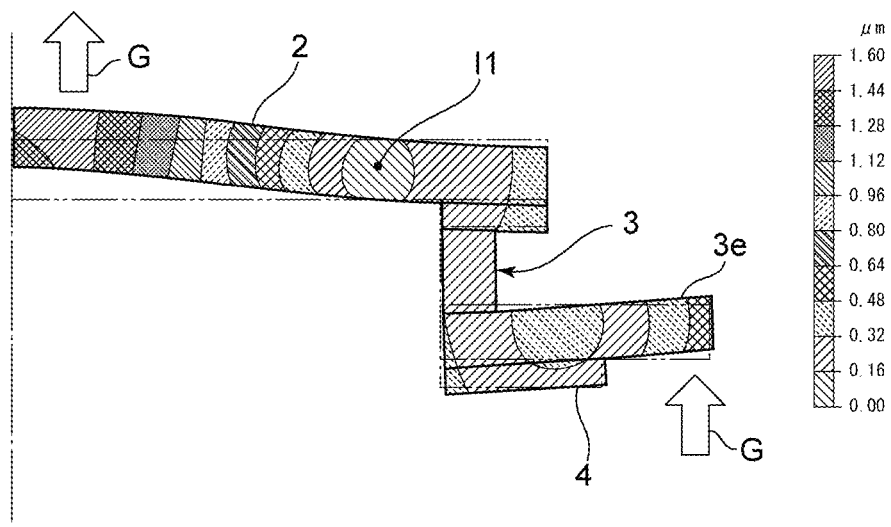
FIG. 8 is a schematic diagram that illustrates displacement distribution for explaining a second mode.

Next, a driving method of the vibration device 1 of the present preferred embodiment will be described. The ring-shaped piezoelectric element 4 is driven. That is, an alternating current electric field is applied between the electrodes 4b and 4c. A multilayer body that includes the ring-shaped piezoelectric element 4 and the ring-shaped flange portion 3e vibrates in the bending mode. The displacement of this bending vibration propagates to the light transmission body 2 via the cylindrical body main body 3d of the cylindrical body 3. As a result, vibration in the (0,0) mode occurs in the light transmission body 2. In this case, two vibration modes of the first mode illustrated in FIG. 7 and the second mode illustrated in FIG. 8 occur. FIG. 7 and FIG. 8 are diagrams that schematically illustrate the displacement distribution by half sectional views of the cylindrical body 3 as in the case of FIG. 6A.

In the first mode illustrated in FIG. 7, as indicated by arrow G and arrow −G, a portion of the ring-shaped flange portion 3e on an outer circumferential side and a central portion of the light transmission body 2 are displaced in reverse phases. On the other hand, in the second mode illustrated in FIG. 8, as indicated by arrows G and G, the portion of the ring-shaped flange portion 3e on the outer circumferential side and the central portion of the light transmission body 2 vibrate in the same phase.

Further, in the first mode, nodes occur around the points indicated by H1 and H2. On the other hand, in the second mode, a node occurs around point I1 indicated in FIG. 8. Consequently, when the first mode is used, a wide range on the object side of the light transmission body 2 may be displaced. Thus, in the camera 31, the field of view of the image-capturing element 32 is less likely to be restricted. Further, in a region of the light transmission body 2 with a large area, an attached water droplet may be atomized with certainty and removed by vibration in the (0,0) mode.

Figure 17A:
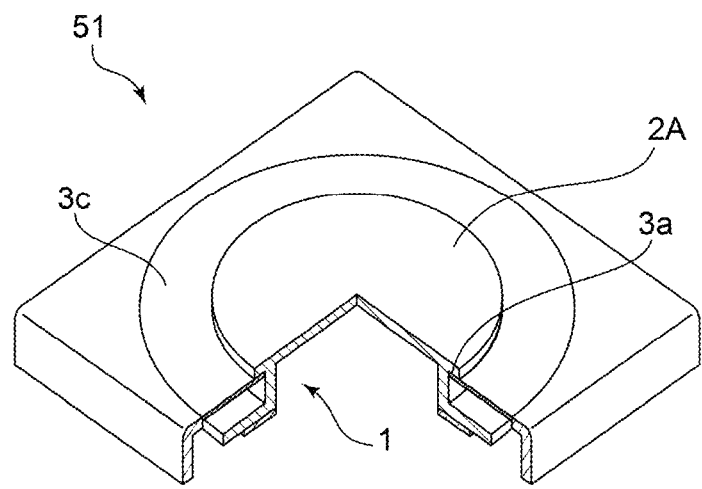
FIGS. 17A and 17B are partial sectional perspective views and front sectional views, respectively, of an ultrasonic transducer device that includes the vibration device according to the first preferred embodiment of the present invention and uses bending vibration of the top plate elastic body as a sounding body of ultrasonic waves.
Figure 17B:
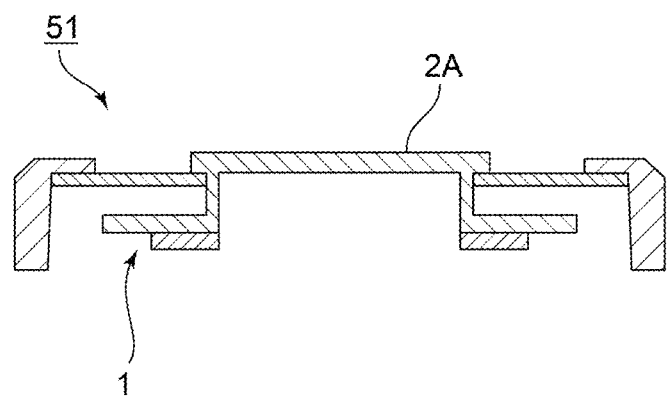

FIGS. 17A and 17B are partial sectional perspective views and front sectional views, respectively, of an ultrasonic transducer device that includes a vibration device according to a preferred embodiment of the present invention. An ultrasonic transducer device 51 includes the vibration device 1. Bending vibration of a top plate elastic body 2A of the vibration device 1 is used as a sounding body of ultrasonic waves. Because the ultrasonic transducer device 51 includes the vibration device 1, sound pressure may be increased.

Figure 18A:
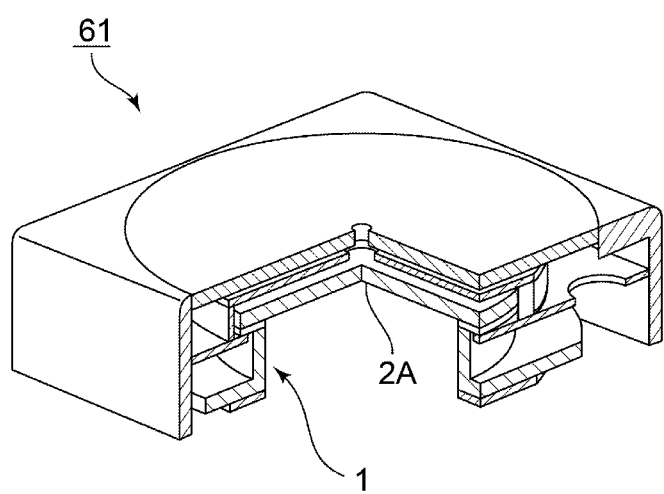
FIGS. 18A and 18B are partial sectional perspective views and front sectional views, respectively, of a pump device that includes the vibration device according to the first preferred embodiment of the present invention and generates pressure by bending vibration of the top plate elastic body.
Figure 18B:
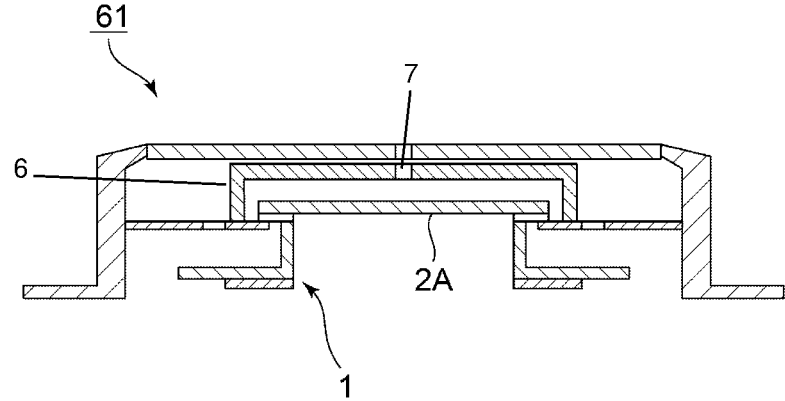

FIGS. 18A and 18B are partial sectional perspective views and front sectional views, respectively, of a pump device that includes a vibration device according to a preferred embodiment of the present invention. A pump device 61 includes the vibration device 1, and the top plate elastic body 2A of the vibration device 1 is used as a diaphragm. The pump device 61 further includes a liquid delivery member 6 including a pass-through hole 7. Consequently, the pump device 61 with high liquid delivery force may be obtained.

Figure 9:
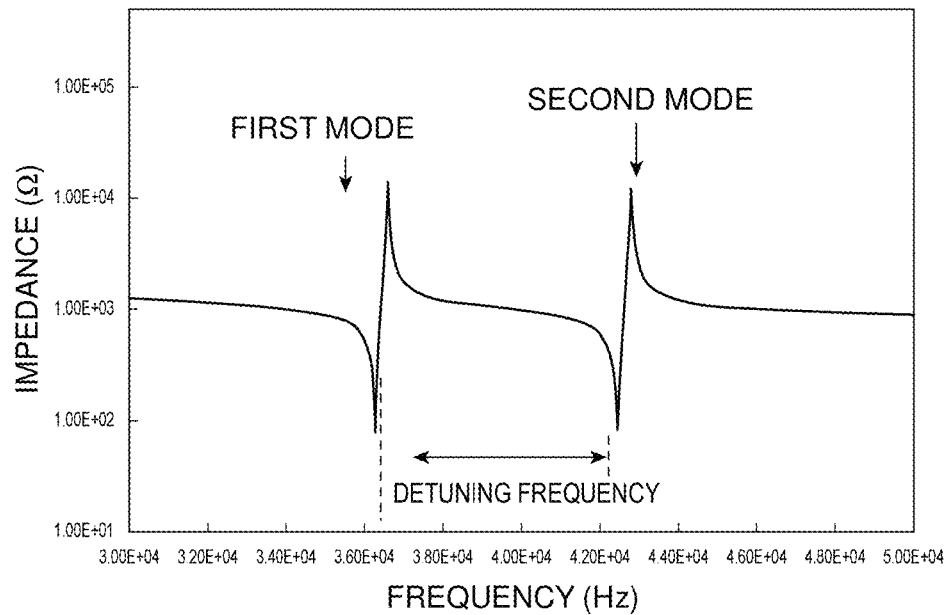
FIG. 9 is a diagram that illustrates frequency positions at which the first mode and the second mode appear.

In order to selectively use the first mode and the second mode, the frequency of the alternating current electric field exerted on the ring-shaped piezoelectric element 4 may be adjusted. FIG. 9 is a diagram that illustrates resonance characteristics in a case where the ring-shaped piezoelectric element 4 is driven. As illustrated in FIG. 9, a response in the second mode appears on a higher frequency side than a response in the first mode. Here, a resonant frequency in the first mode occurs at or around 36.1 kHz, and a resonant frequency in the second mode occurs at or around 42.3 kHz.

Figure 10:
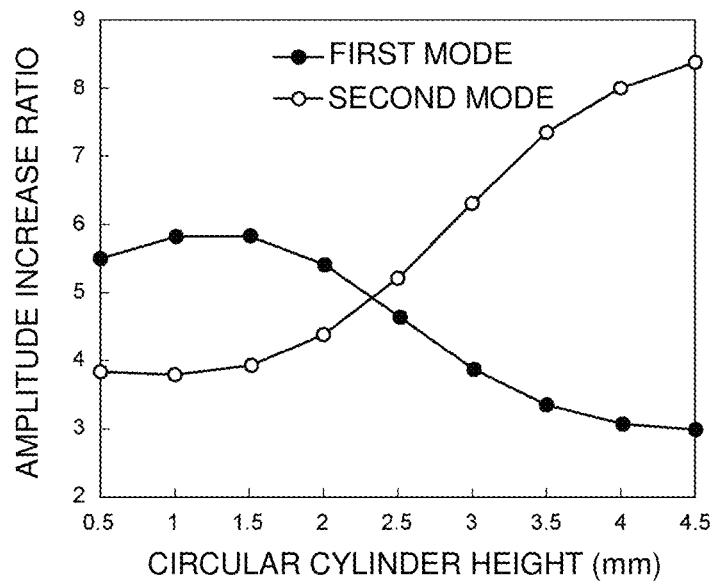
FIG. 10 is a diagram that illustrates the relationship between a circular cylinder height and an amplitude ratio between a light transmission body as the top plate elastic body and the piezoelectric element, that is, an amplitude increase ratio with respect to the first mode and the second mode.
Figure 11:
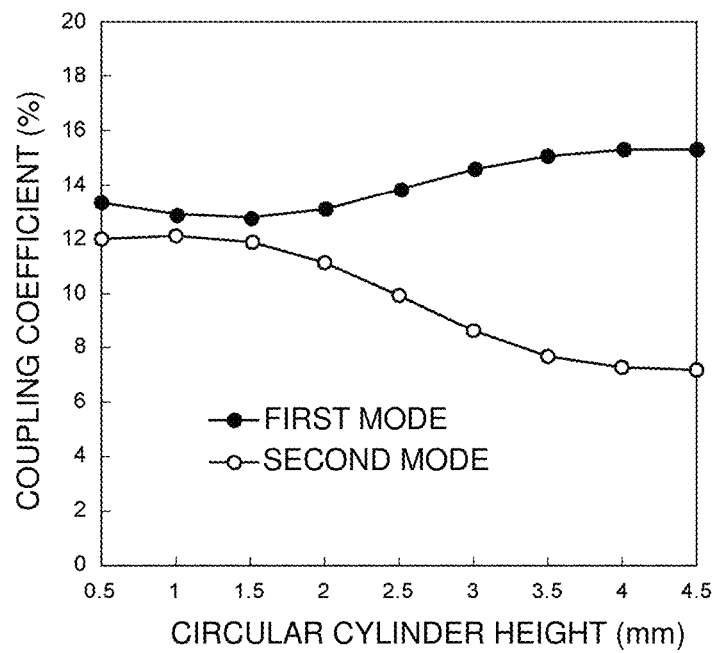
FIG. 11 is a diagram that illustrates the relationship between the circular cylinder height and the coupling coefficient in the first mode and the coupling coefficient in the second mode.

FIG. 10 is a diagram that illustrates the relationship between a circular cylinder height, which is the height of the cylindrical body 3, and a ratio between the maximum displacement of the ring-shaped piezoelectric element 4 and the maximum amplitude of the light transmission body 2, that is, a amplitude increase ratio, with respect to the first mode and the second mode. In the following, it is assumed that the circular cylinder height is the dimension of the cylindrical body 3 in the axial direction, that is, the distance between the first end portion 3a and the second end portion 3b. FIG. 11 is a diagram that illustrates the relationship between the circular cylinder height and the coupling coefficient in the first mode and the coupling coefficient in the second mode. Here, in the cylindrical body 3, the opening diameter is set to about 16 mm, the outer diameter of the cylindrical body main body 3d is set to about 18 mm, and the outer diameter of the ring-shaped flange portion 3e is set to 26 about mm, for example. Note that all of the outer diameters are the diameters of circles. Further, the outer diameter of the light transmission body 2 is set to about 18 mm, and the thickness is set to about 1.3 mm, for example. The outer diameter of the hinge portion 3c is set to about 20 mm, and the thickness is set to about 0.5 mm, for example. The thickness of the ring-shaped flange portion 3e is set to about 1.00 mm, and the entire cylindrical body 3 is made of SUS304 stainless steel, for example. Then, the circular cylinder height of the cylindrical body 3 is changed.

As illustrated in FIG. 10, the amplitude increase ratios in the two modes intersect with each other at a specific circular cylinder height. That is, the coupling coefficient in the first mode becomes large at a certain height or higher, and larger vibration is likely to occur. However, the increase ratio lowers, and the limit value of fracture of the piezoelectric element is decreased. On the other hand, although not illustrated, node I1 of the second mode indicated in FIG. 8 moves toward an outer circumferential side of the light transmission body 2 as the circular cylinder height increases. Because the node is present in an outer circumference of the cylindrical body or in the light transmission body 2, which is a portion directly above the cylindrical body, an amplitude with a large diameter is achieved as if the vibration mode were the first mode, and the amplitude increase ratio is largely improved in addition. However, because the weight of metal portions increases as the length of the cylindrical body increases, a disadvantage that the coupling coefficient is decreased occurs.

In consideration of such points, while the height at which the amplitude increase ratios match between the first mode and second mode is set as the border, it is possible to select a design in which the first mode is used on the shorter side of the border and the second mode is used on the longer side of the boarder. As a result, vibration with a certain amplitude increase ratio or higher and a large opening area may be achieved in both of the modes.

Figure 12:
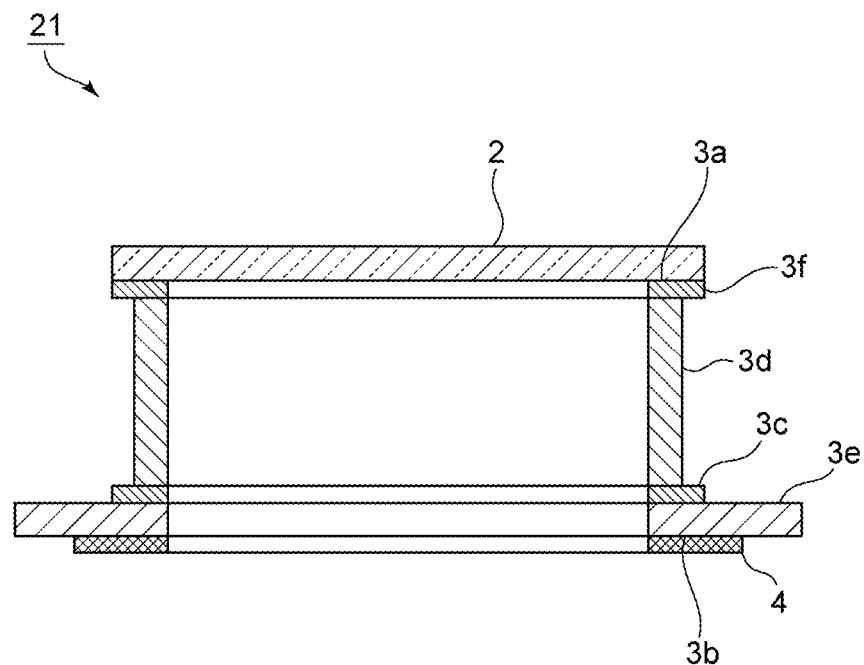
FIG. 12 is a front sectional view of a vibration device according to a second preferred embodiment of the present invention.

FIG. 12 is a front sectional view of a vibration device according to a second preferred embodiment of the present invention. In the vibration device 21, hinge portions 3c and 3f providing support are respectively provided to each of ends of the cylindrical body main body 3d. External support may be provided by using either one of the hinge portions 3c and 3f. Here, for example, in a case where the dimension of the cylindrical body main body 3d in the axial direction is set to about 7.0 mm, the outer diameter of the cylindrical body main body 3d is set to about 18 mm, the outer diameter of the hinge portions 3c and 3f is set to about 19 mm, the thickness thereof is set to about 0.5 mm, the outer diameter of the ring-shaped flange portion 3e is set to about 26 mm, and the thickness thereof is set to about 1.0 mm, for example, the light transmission body 2 may be caused to vibrate in the (0,1) mode or the (0,2) mode. These modes are suitable for movement and removal of raindrops or dirt in a camera but are not preferable for the ultrasonic transducer device or the pump device.

Figure 13A:
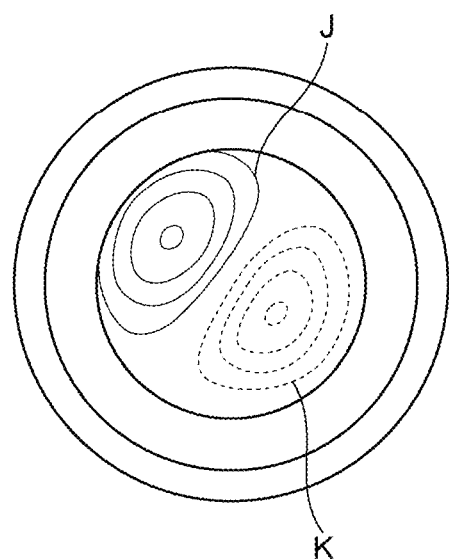
FIGS. 13A and 13B are schematic diagrams that illustrate the displacement distribution of a first mode and a second mode, respectively, in a (0,1) mode.
Figure 13B:
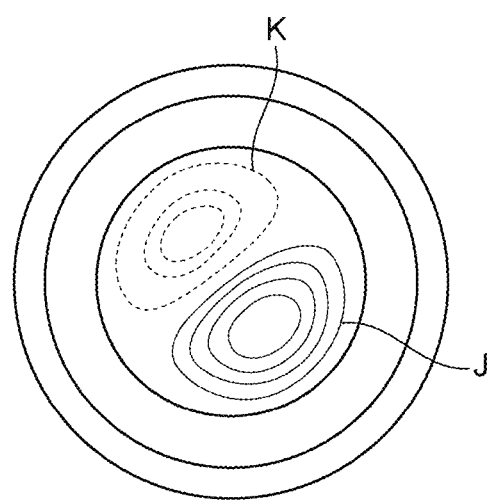

Note that in the above-described vibration device 1, the first or second mode between the first and second modes for the (0,0) mode is selectively used in accordance with a length of the cylindrical body. Two similar modes are present in the (0,1) mode and the (0,2) mode. FIGS. 13A and 13B are schematic diagrams that illustrate the displacement distribution of a first mode and a second mode, respectively, in the (0,1) mode. Here, the displacement distribution of the vibration device is illustrated from a side on which a plan view of the light transmission body is made. In the light transmission body, region J indicated by an elliptical or substantially elliptical shape of a solid line and region K indicated by an elliptical or substantially elliptical shape of a broken line are portions that are displaced in reverse phases. In FIG. 13A, region J and region K are respectively positioned on each side of the central line that passes through the center of the light transmission body. Note that the ring-shaped piezoelectric element is divided into two portions, and polarization is inverted.

Figure 14A:
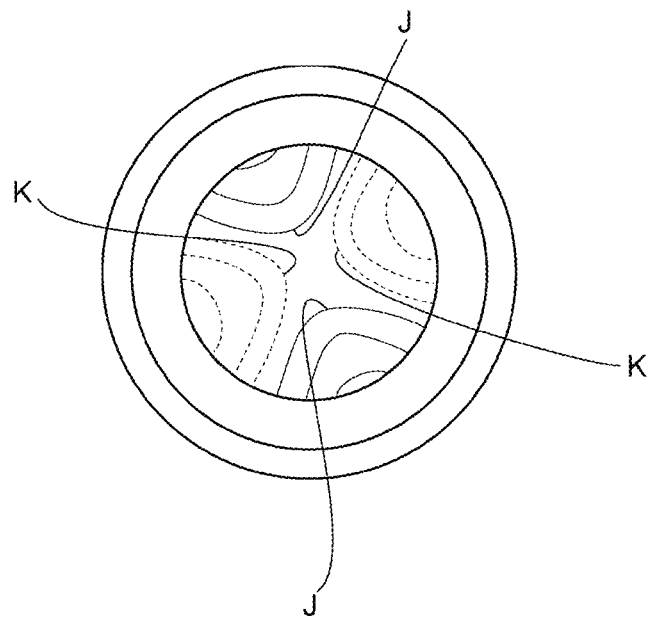
FIGS. 14A and 14B are schematic diagrams that illustrate the displacement distribution of a first mode and a second mode, respectively, in a (0,2) mode.
Figure 14B:
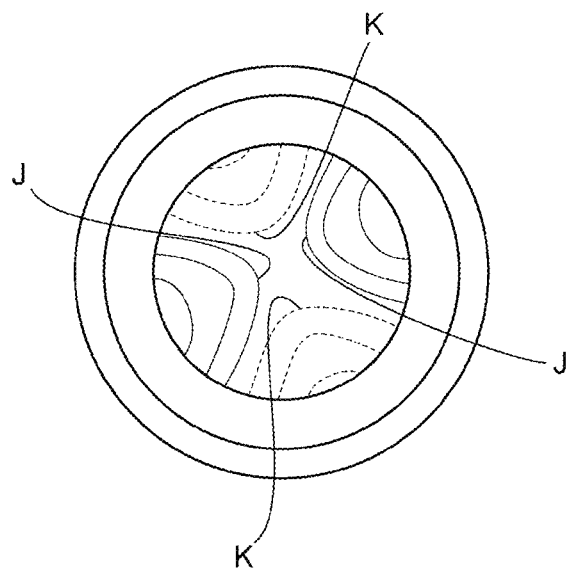

Meanwhile, in the second mode illustrated in FIG. 13B, region J and region K are respectively positioned on each side of the central line. However, in the second mode, the light transmission body is displaced in a reverse phase to that in the first mode. FIGS. 14A and 14B are diagrams that illustrate the displacement distribution of the light transmission body in a first mode and a second mode, respectively, in the (0,2) mode. Here, regions J indicated by solid lines and regions K indicated by broken lines are also displaced in reverse phases. In this case, the ring-shaped piezoelectric element are divided into four portions, and polarizations of neighboring ¼ elements are inverted.

Figure 15:
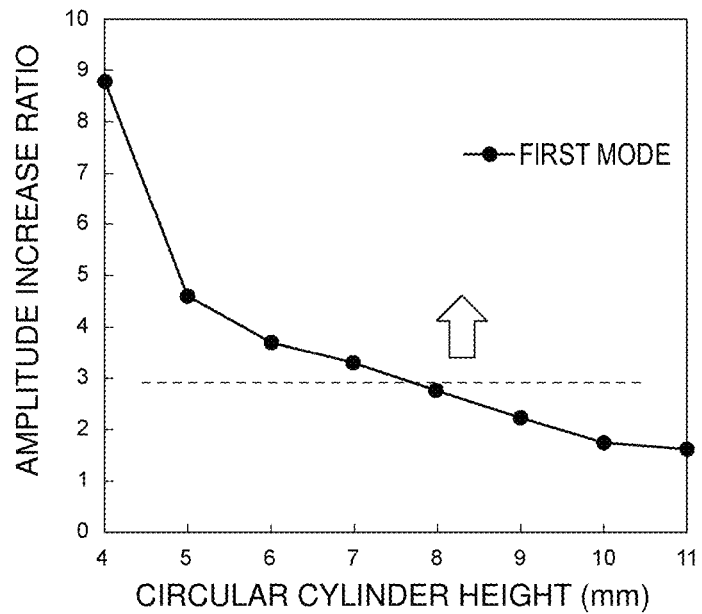
FIG. 15 is a diagram that illustrates the circular cylinder height and the amplitude increase ratio of the amplitude of the piezoelectric element to the amplitude of the light transmission body as the top plate elastic body in a case of the (0,1) mode with respect to the first mode.

FIG. 15 illustrates the ratio between the maximum amplitude of the ring-shaped piezoelectric element 4 and the maximum displacement value of the light transmission body 2 in the (0,1) mode, that is, the amplitude increase ratio, with respect to the first mode.

Figure 16:
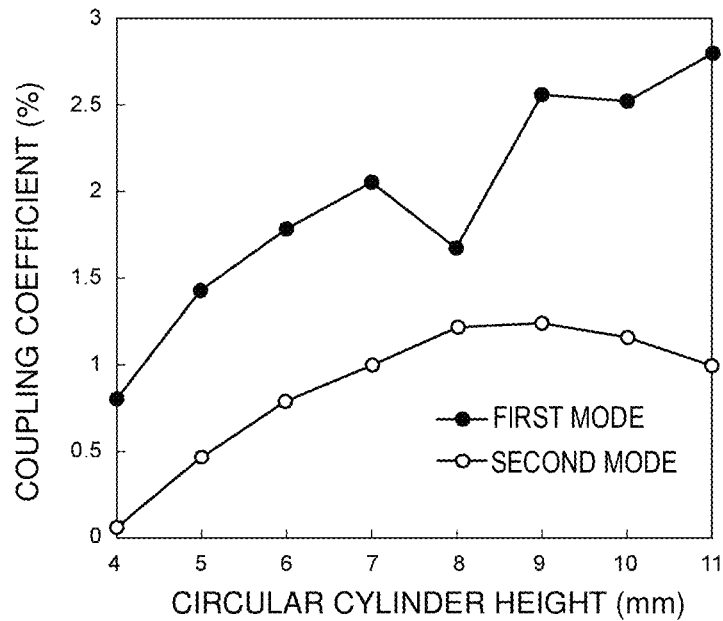
FIG. 16 is a diagram that illustrates the relationship between the circular cylinder height and the coupling coefficients in the first mode and the second mode in a case of the (0,1) mode.

FIG. 16 is a diagram that illustrates the relationship between the circular cylinder height and the coupling coefficients in the first mode and the second mode in a case where the (0,1) mode is used.

It is understood that also in a case where the (0,1) mode is used, the coupling coefficients and the amplitude increase ratio may be changed by adjusting the circular cylinder height. However, because the coupling coefficients themselves are lower than the (0,0) mode and piezoelectric excitation efficiency is thus low regardless of the amplitude increase ratio, it is preferable to perform excitation in the first mode at any height of the cylindrical body. Usually, it is preferable to perform excitation by vibration with a coupling coefficient of about 1% or higher. Thus, the amplitude increase ratio in the second mode is not illustrated. In the first mode, a length of approximately 8 mm at which the amplitude increase ratio has a value of about 3.3, for example, is preferable or optimal.

Note that in the vibration device 1, the light transmission body 2 preferably has a flat plate shape but may have another shape, such as a dome shape, for example. Further, the image-capturing element 32 may further include a lens module disposed on the light transmission body side of the image-capturing element.

While preferred embodiments of the present invention have been described above, it is to be understood that variations and modifications will be apparent to those skilled in the art without departing from the scope and spirit of the present invention. The scope of the present invention, therefore, is to be determined solely by the following claims.

What is claimed is:

1. A vibration device comprising:
a top plate elastic body;
a cylindrical body including a first end portion and a second end portion on an opposite side from the first end portion and being coupled with the top plate elastic body to retain the top plate elastic body on a side of the first end portion; wherein
the cylindrical body includes, on a side of the second end portion, a ring-shaped flange portion extending outward in a radial direction of the cylindrical body;
a piezoelectric element is fixed to the ring-shaped flange portion to cause the cylindrical body including the ring-shaped flange portion to vibrate; and
the ring-shaped flange portion has an outer diameter and/or thickness configured such that, when the piezoelectric element is driven, the top plate elastic body is vibrated in a first mode in which a phase of vibration in the ring-shaped flange portion of the cylindrical body is reverse to a phase of vibration of the top plate elastic body coupled with the cylindrical body.

2. The vibration device according to claim 1, wherein the ring-shaped flange portion includes a first surface on a side of the top plate elastic body and a second surface on an opposite side from the first surface, and the piezoelectric element is fixed to the second surface.

3. The vibration device according to claim 1, wherein when a ratio between a maximum displacement of the piezoelectric element and a bending vibration amplitude of the top plate elastic body defines an amplitude increase ratio, a distance between the first end portion and the second end portion is longer than a distance between the first end portion and the second end portion of the cylindrical body, and vibration occurs in the second mode, the distance between the first end portion and the second end portion of the cylindrical body is set such that the amplitude increase ratio in the second mode has a same or substantially a same value as the amplitude increase ratio in the first mode; and
the second mode is a mode in which the phase of vibration in the ring-shaped flange portion of the cylindrical body and the phase of vibration in the top plate elastic body coupled with the cylindrical body are a same phase when the piezoelectric element is driven.

4. The vibration device according to claim 1, wherein the piezoelectric element is annularly disposed along a circumferential direction of the ring-shaped flange portion.

5. The vibration device according to claim 1, wherein a distance between the first end portion and the second end portion of the cylindrical body is equal to or longer than a thickness of the ring-shaped flange portion.

6. The vibration device according to claim 1, wherein a dimension of the ring-shaped flange portion that extends outward in the radial direction is longer than a distance between the first end portion and the second end portion of the cylindrical body.

7. The vibration device according to claim 1, wherein a distance between the first end portion and the second end portion of the cylindrical body is set such that a position of a node of vibration in the first mode is positioned inward in the radial direction of an outer circumferential edge of the ring-shaped flange portion.

8. The vibration device according to claim 1, wherein at least one of the top plate elastic body, the cylindrical body, and the ring-shaped flange portion is a separate member from remaining ones of the top plate elastic body, the cylindrical body, and the ring-shaped flange portion.

9. The vibration device according to claim 1, wherein the top plate elastic body, the cylindrical body, and the ring-shaped flange portion are defined by an integral unitary structure made of an identical material.

10. The vibration device according to claim 1, wherein the piezoelectric element includes a ring-shaped piezoelectric body that is polarized in a direction in which the first and second end portions of the cylindrical body are coupled together and electrodes that are provided on first and second opposed surfaces of the ring-shaped piezoelectric body.

11. A raindrop or dirt removal device comprising:
the vibration device according to claim 1; and
a camera disposed behind the top plate elastic body of the vibration device; wherein
the top plate elastic body is a light transmission body.

12. The raindrop or dirt removal device according to claim 11, wherein the ring-shaped flange portion includes a first surface on a side of the top plate elastic body and a second surface on an opposite side from the first surface, and the piezoelectric element is fixed to the second surface.

13. An ultrasonic transducer device comprising:
the vibration device according to claim 1;
wherein
bending vibration of the top plate elastic body defines and functions as a sound wave generation source and retains a node line of the top plate elastic body.

14. The ultrasonic transducer device according to claim 13, wherein the ring-shaped flange portion includes a first surface on a side of the top plate elastic body and a second surface on an opposite side from the first surface, and the piezoelectric element is fixed to the second surface.

15. A pump device comprising:
the vibration device according to claim 1; and
a liquid delivery member that defines a liquid delivery portion with the top plate elastic body of the vibration device; wherein
a pass-through hole is provided in the liquid delivery member;
the top plate elastic body defines and functions as a diaphragm; and
the pass-through hole of the liquid delivery member is pushed out by a fluid.

16. The pump device according to claim 15, wherein the ring-shaped flange portion includes a first surface on a side of the top plate elastic body and a second surface on an opposite side from the first surface, and the piezoelectric element is fixed to the second surface.

* * * * *